(12) United States Patent
Tomozawa

(10) Patent No.: US 7,267,395 B2
(45) Date of Patent: Sep. 11, 2007

(54) VEHICLE UPPER BODY STRUCTURE

(75) Inventor: Kosaku Tomozawa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 16 days.

(21) Appl. No.: 11/120,772

(22) Filed: May 3, 2005

(65) Prior Publication Data

US 2005/0253422 A1 Nov. 17, 2005

(30) Foreign Application Priority Data

May 11, 2004 (JP) ............................. 2004-140940

(51) Int. Cl.
*B62D 25/24* (2006.01)

(52) U.S. Cl. ..................... 296/203.03; 296/203.01; 49/360

(58) Field of Classification Search ........... 296/203.03, 296/203.01, 155; 49/360, 213, 209
See application file for complete search history.

(56) References Cited

U.S. PATENT DOCUMENTS

| | | | |
|---|---|---|---|
| 2,210,533 A * | 8/1940 | Fisher et al. ........... | 296/203.01 |
| 4,582,357 A * | 4/1986 | Nakamura et al. ..... | 296/203.03 |
| 4,981,321 A * | 1/1991 | Watanabe et al. ........... | 296/155 |
| 4,991,905 A * | 2/1991 | Watanabe et al. ........... | 296/155 |
| 6,299,241 B1* | 10/2001 | Heya et al. ............ | 296/203.03 |
| 6,709,045 B2* | 3/2004 | Shuto et al. ................. | 296/155 |
| 6,976,730 B2* | 12/2005 | Mally et al. ........... | 296/203.03 |

FOREIGN PATENT DOCUMENTS

JP 11-099961 4/1999

* cited by examiner

*Primary Examiner*—Dennis H. Pedder
*Assistant Examiner*—Michael Hernandez
(74) *Attorney, Agent, or Firm*—Rankin, Hill, Porter & Clark LLP

(57) ABSTRACT

A vehicle upper body structure of the present invention includes: a step part for arranging a slide rail formed on a roof side rail; a pillar that is joined to the roof side rail in the vicinity of a standing wall that constitutes a front end part of the step part; and a roof arch that is joined to the roof side rail together with the pillar in the vicinity of the standing wall.

3 Claims, 5 Drawing Sheets

VEHICLE UPPER BODY STRUCTURE

BACKGROUND OF THE INVENTION

1. Field of the Invention

The present invention relates to a vehicle upper body structure.

Priority is claimed on Japanese Patent Application No. 2004-140940, filed May 11, 2004, the content of which is incorporated herein by reference.

2. Description of Related Art

For a vehicle having a slide door that slides in the vehicle lengthwise direction, there is disclosed one in which there is provided on the upper side of the vehicle body a roof side rail that extends in the vehicle lengthwise direction, and a slide rail being supported by means of a bracket on the bottom side of this roof side rail (for example, see Japanese Unexamined Patent Application, First Publication No. 11-99961). Moreover, there is a vehicle in which a step part for arranging the slide rail is formed on the roof side rail, and the slide rail is supported by a roof side outer upper member, which is disposed so as to cover this step part from above.

In order to improve the rigidity of the vehicle body, it is desirable to strongly join a roof arch, which extends in the vehicle widthwise direction, and a pillar, which lies along the vertical direction, to the roof side rail, which is provided on the top side of the vehicle body and extends in the vehicle lengthwise direction.

However, it is difficult to strongly join the roof arch and the pillar onto the roof side rail in a vehicle having a slide door that slides as mentioned above, since such a vehicle requires a slide rail to be disposed on the inside in the vehicle widthwise direction, of the top side part of the vehicle body.

An object of the present invention is to provide a vehicle upper body structure in which the roof arch and the pillar can be strongly joined onto the roof side rail in the case where a step part for arranging the slide rail is formed on the roof side rail.

SUMMARY OF THE INVENTION

The present invention provides a vehicle upper body structure includes: a step part, for arranging a slide rail, formed on a roof side rail; a pillar that is joined to the roof side rail in the vicinity of a standing wall that constitutes a front end part of the step part; and a roof arch that is joined to the roof side rail together with the pillar in the vicinity of the standing wall.

According to the present invention, in the case in which the step part for arranging the slide rail is formed on the roof side rail, the pillar and roof arch are joined in the vicinity of the standing wall that constitutes the front end part of this step part, that is, in the vicinity of the part of the roof side rail reinforced by the standing wall. As a result, the roof arch and the pillar are strongly joined to the roof side rail.

DETAILED DESCRIPTION OF THE INVENTION

One embodiment of the vehicle upper body structure of the present invention is described hereunder, with reference to the drawings.

Figure 1:
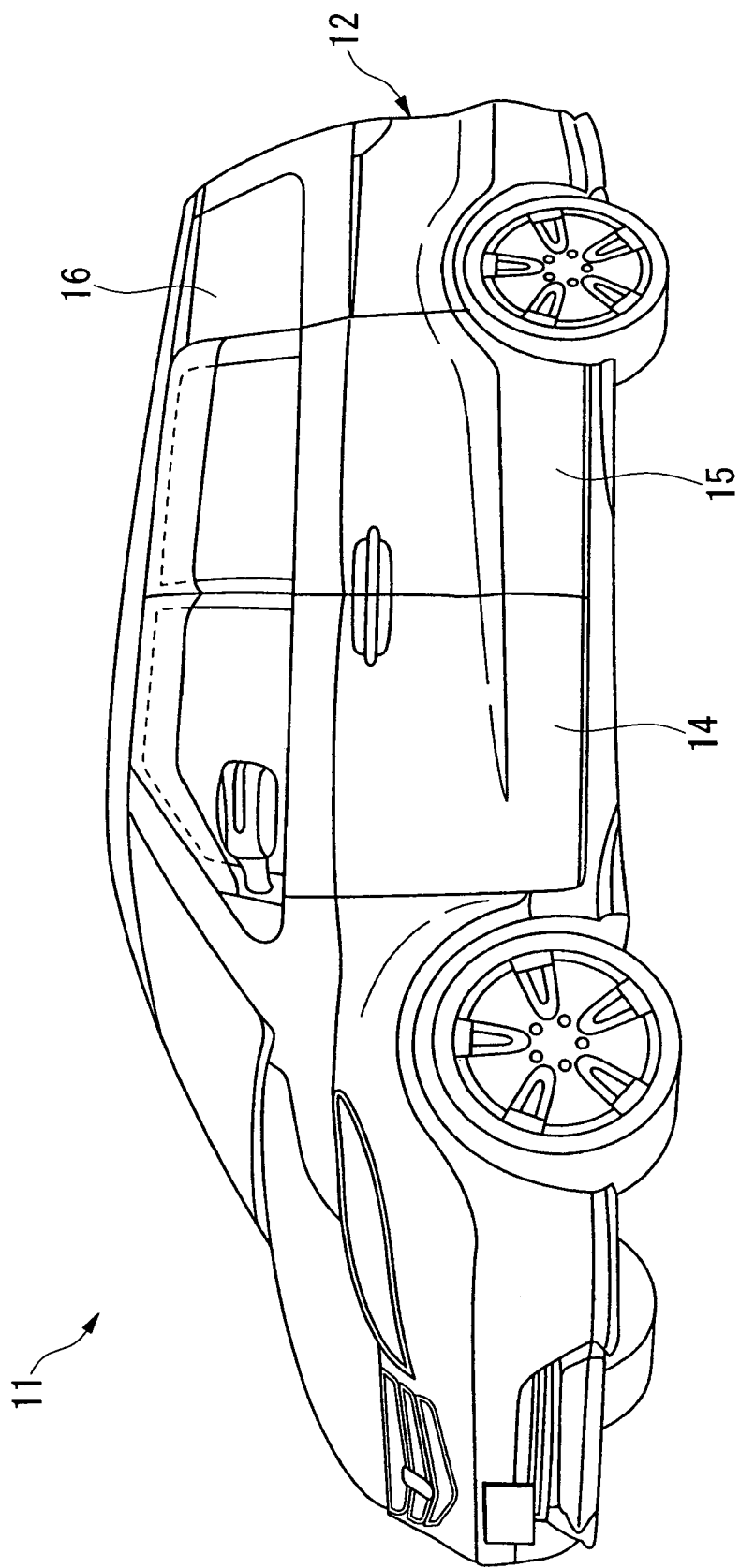
FIG. 1 is a perspective view showing one embodiment of a vehicle where a vehicle upper body structure of the present invention is employed.

As shown in FIG. 1, a vehicle 11 has a front door 14 and a rear door 15 provided on the side part of a vehicle body 12. The rear door 15 is a sliding door that opens and closes by sliding in the lengthwise direction of the vehicle body. Moreover, a rear quarter window 16 is provided on the side part of the vehicle body 12 in a position to the rearward side of the closed rear door 15.

Figure 2:
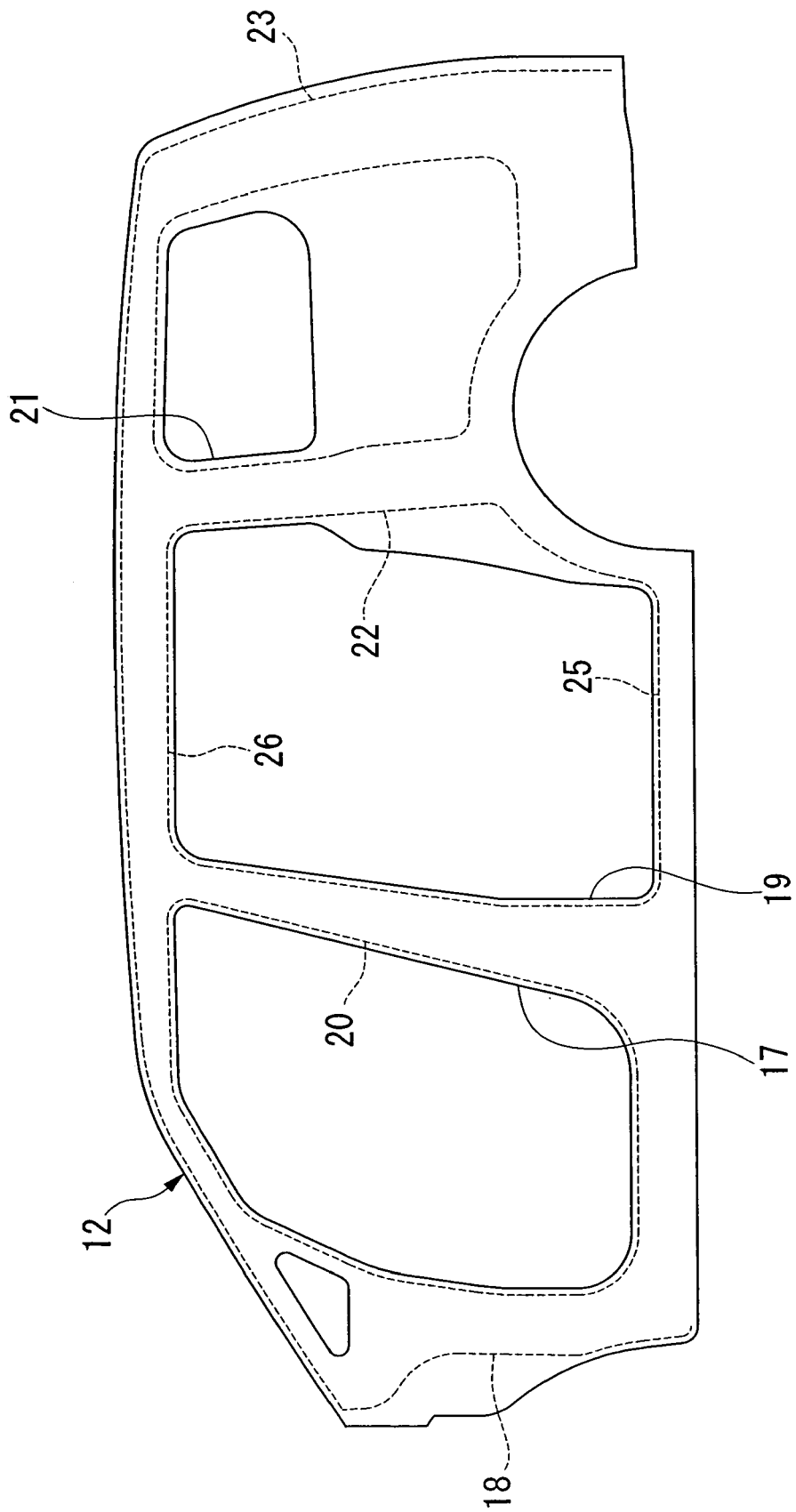
FIG. 2 is a side view schematically showing each part of the vehicle body frame and the like on the side part of the vehicle body.

In FIG. 2 the skeletal structure of the side part of the vehicle body 12 is schematically shown. A front pillar 18 that constitutes the vehicle body frame extends in a substantially vertical direction on the vehicle body front side of an aperture part 17 on the side part of the vehicle body 12 that is opened and closed by the front door 14 shown in FIG. 1. The horizontal cross section of the front pillar 18 has a closed hollow structure. A center pillar 20 that constitutes the vehicle body frame extends in a vertical direction between the aperture part 17 and an aperture part 19 that is opened and closed by the rear door 15 shown in FIG. 1. The horizontal cross section of the center pillar 20 also has a closed hollow structure. A rear quarter pillar 22 that constitutes the vehicle body frame extends in a vertical direction between the aperture part 19 and an aperture part 21 of the rear quarter window 16 shown in FIG. 1. The horizontal cross section of the rear quarter pillar 22 also has a closed hollow structure. A rear pillar 23 that constitutes the vehicle body frame extends in a vertical direction on the rear side of the aperture part 21. The horizontal cross section of the rear pillar 23 also has a closed hollow structure.

The bottom end parts of the front pillar 18, the center pillar 20, and the rear quarter pillar 22 are joined to a side sill 25. The side sill 25 constitutes the vehicle body frame that extends in a lengthwise direction of the vehicle body, on the bottom part of the vehicle body side part. The cross section of the side sill 25 orthogonal to the lengthwise direction of the vehicle body has a closed hollow structure.

Moreover, the top end parts of the front pillar 18, the center pillar 20, and the ear quarter pillar 22 are joined to a roof side rail 26. The roof side rail 26 constitutes the vehicle body frame that extends in the lengthwise direction of the vehicle body at the top part of the vehicle body side part. The cross section of the roof side rail 26 orthogonal to the lengthwise direction of the vehicle body has a closed section hollow structure.

Figure 3:
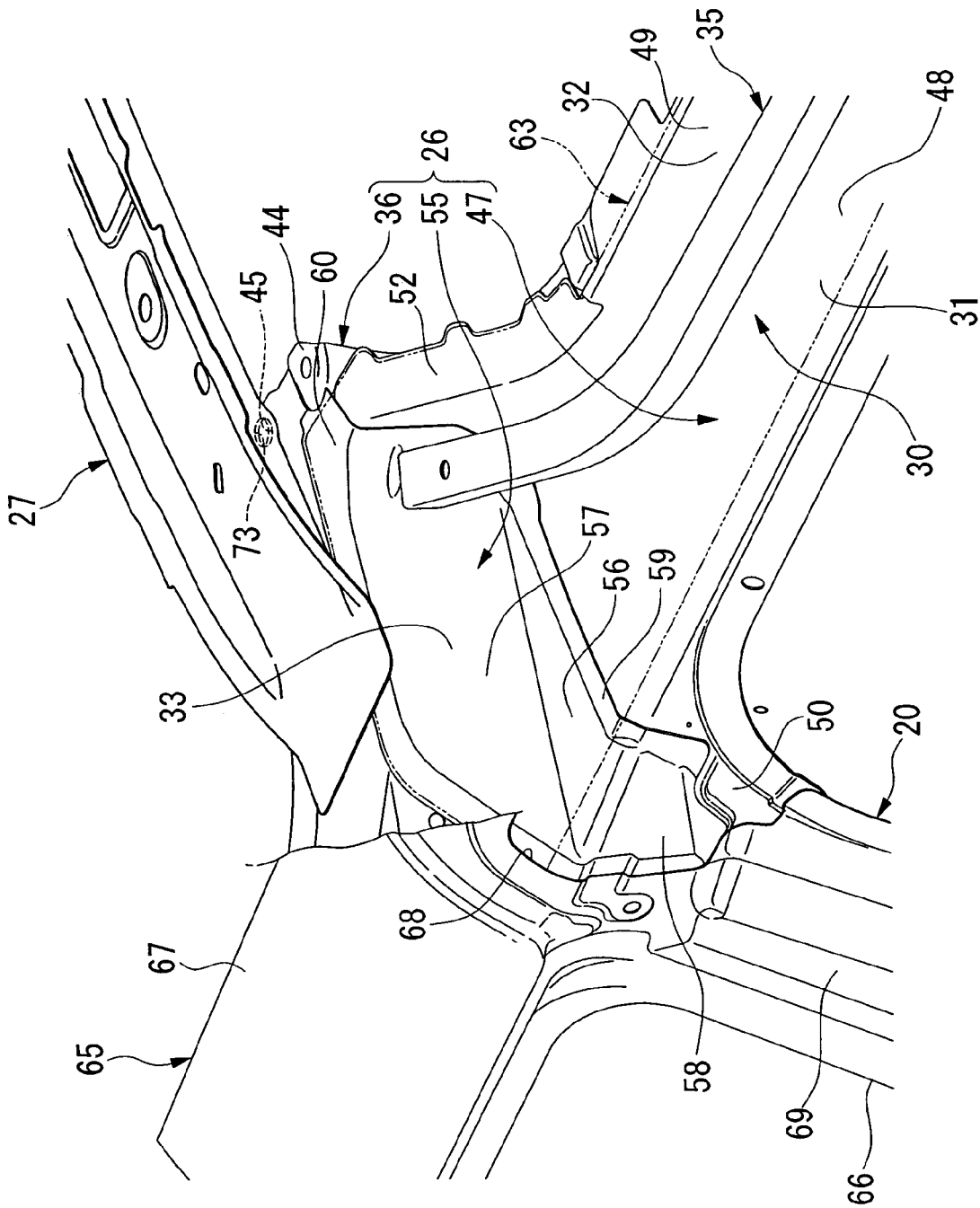
FIG. 3 is a cutaway perspective view showing one part of the vehicle upper body structure of the present embodiment.
Figure 4:
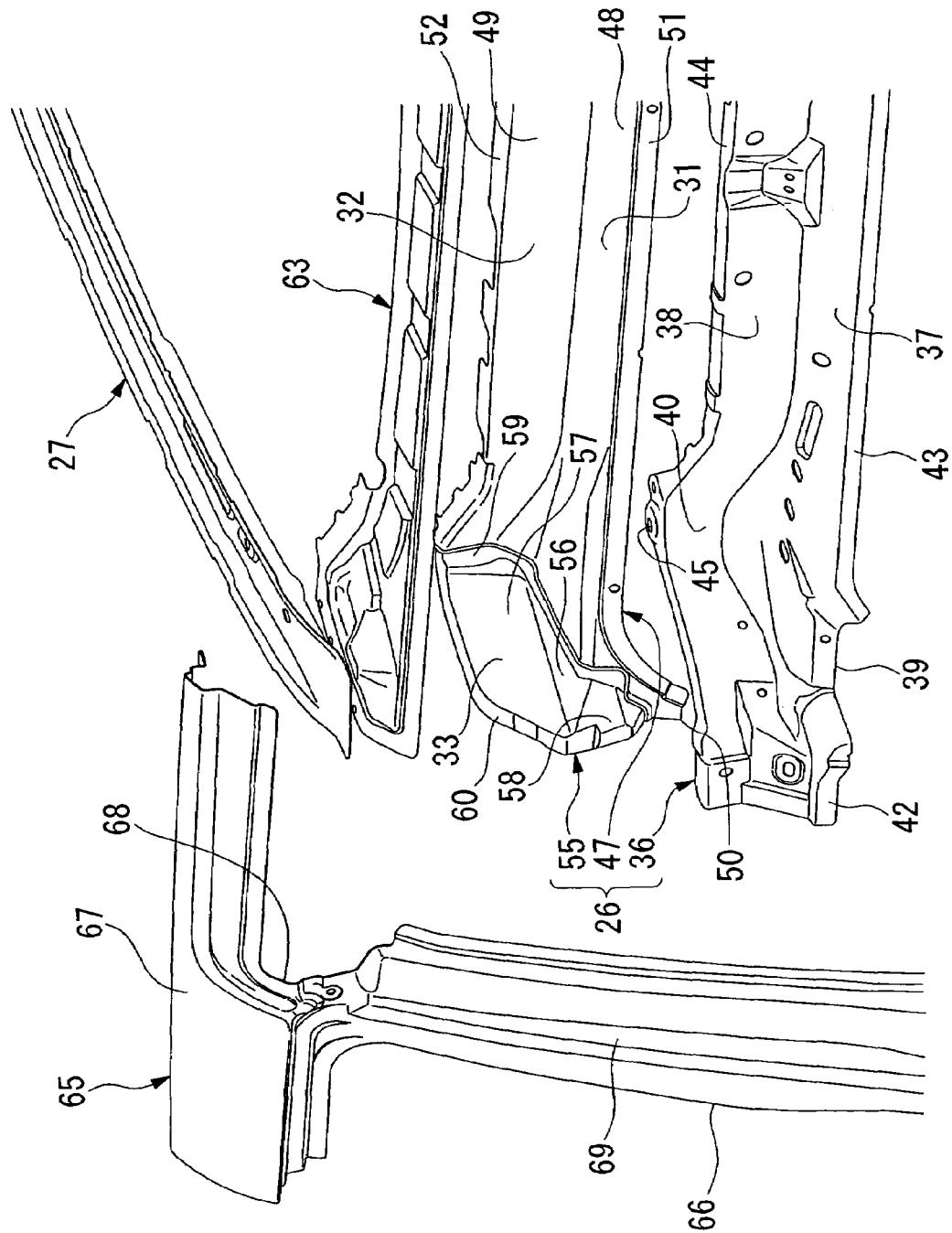
FIG. 4 is an exploded perspective view showing the vehicle upper body structure of the present embodiment.
Figure 5:
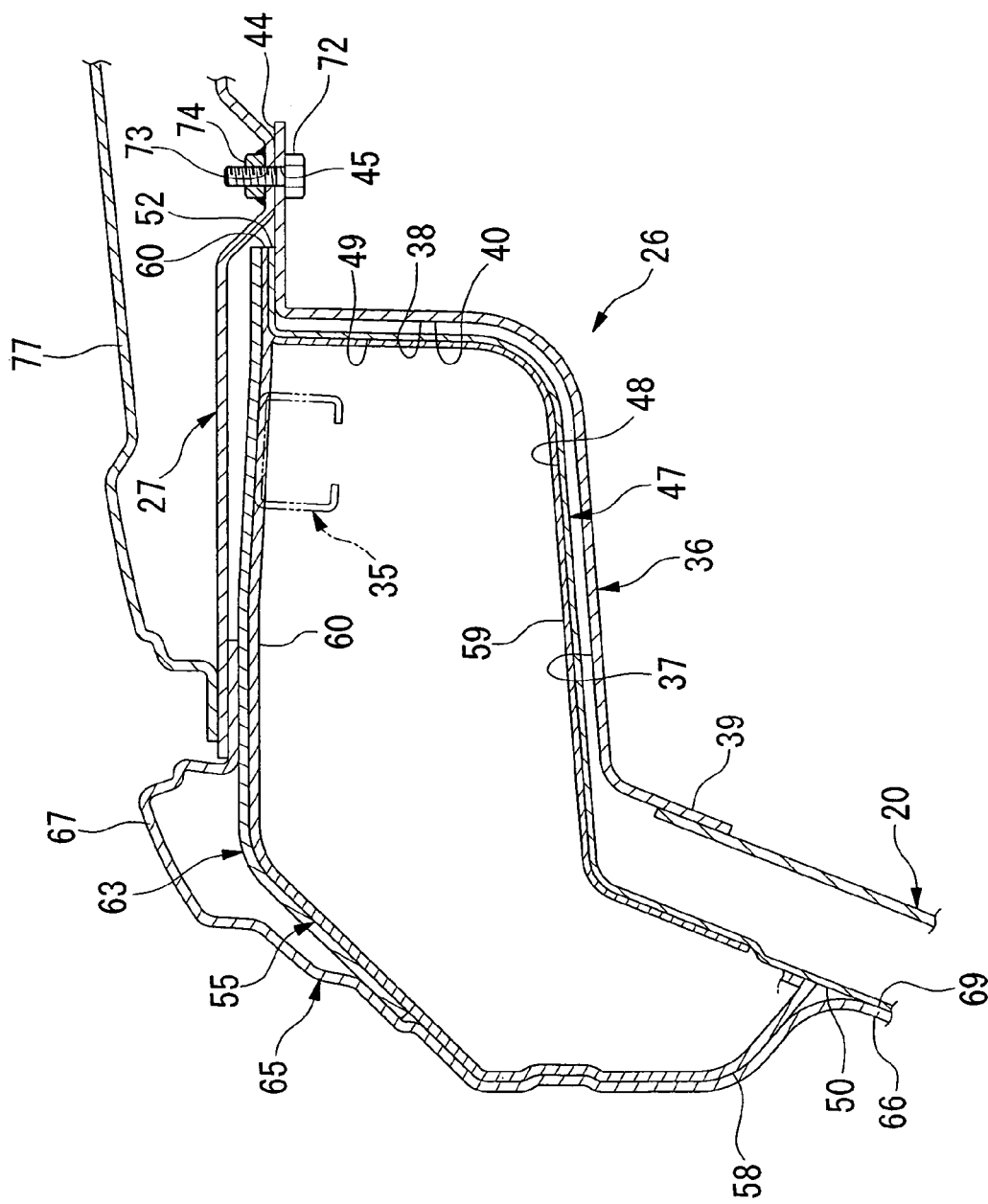
FIG. 5 is a cross sectional view schematically showing each join part of the vehicle upper body structure of the present embodiment.

In FIG. 3 to FIG. 5, the join parts with the center pillar 20, which is the substantial part of the present embodiment, the roof side rail 26 and a roof arch 27 provided on the top part of the vehicle body in a widthwise direction of the vehicle are shown.

As shown in FIG. 3, a step part 30 is provided on the roof side rail 26. The step part 30 is the top part on the vehicle widthwise outside, of the roof side rail 26, and is positioned in the rear part of the center pillar 20 which is from the midpoint to the rear side. The step part 30 is positioned lower than the top part of the front part of the roof side rail 26, and is formed dented further toward the inside than the side part on the vehicle widthwise outside of the front part of the roof side rail 26.

The step part 30 has a bottom wall 31, a side wall 32 and a standing wall 33. The bottom wall 31 extends substantially horizontally in the vehicle lengthwise direction, and its front end part has a shape that projects slightly inward in the vehicle widthwise direction. The sidewall 32 rises upward in a substantially vertical direction from the edge part on the vehicle widthwise inside of the bottom wall 31, and extends in the lengthwise direction of the vehicle body. The standing wall 33 rises upward in a substantially vertical direction from the front end part, in the vehicle lengthwise direction, of the bottom wall 31, and is substantially orthogonal to the lengthwise direction of the vehicle body, and the inside of the standing wall 33, in the vehicle widthwise direction, joins the side wall.

The step part 30 is provided in order to arrange a slide rail 35 that slidably supports the rear door 15. Moreover, the step part 30 is provided in order to allow movement of an arm, not shown in the diagram, that extends from the slide rail 35 to the rear door 15.

A roof side inner member 36 is provided on the vehicle widthwise inside of the roof side rail 26. As shown in FIG. 4, the roof side inner member 36 has a bottom plate part 37, a side plate part 38 and a downward projecting part 39. The bottom plate part 37 is the top part on the vehicle widthwise outside and extends in the vehicle lengthwise direction, and its entire length is substantially along the horizontal. The side plate part 38 rises upward from the inner edge, in the vehicle widthwise direction, of the bottom plate part 37. The downward projecting part 39 projects slightly downward from the midpoint on the front part side, in the vehicle lengthwise direction, of the bottom plate part 37 and furthermore, has a concave shape inward in the vehicle widthwise direction. The downward projection part 39 constitutes the center pillar 20. At the position of the center pillar 20 in the vehicle lengthwise direction, the bottom plate part 37 projects so that it is tapered inward in the vehicle widthwise direction, and becomes thinner towards its end. The side plate part 38 is formed so that it matches the bottom plate part 37. Both the bottom plate part 37 and the side plate part 38 form an inward projecting part 40 that has a concave shape so that they are tapered inward in the widthwise direction.

Furthermore, the roof side rail 26 has flange parts 42, 43 and 44. The flange part 42 is continuously formed on the front edge part of the downward projecting part 39 in the vehicle lengthwise direction and on the edge part, on the vehicle widthwise outside, of the bottom plate part 37 provided forward of the front edge part. The flange part 43 is continuously formed on the rear edge part, in the vehicle lengthwise direction, of the downward projecting part 39 and on the edge part, on the vehicle widthwise outside, of the bottom plate part 37 provided on the rear side of the rear edge part. The flange part 44 is continuously formed on the top edge part of the side plate part 38 that includes the inner projecting part 40. A mounting hole 45 is formed in the flange part 44 so as to pass completely through the flange part 44 in a vertical direction in the innermost position, in the vehicle widthwise direction, of the inner projecting part 40.

The roof side rail 26 has a roof side outer lower member 47. The roof side outer lower member 47 is disposed on the top side of the roof side inner member 36, on the vehicle widthwise outside, at the rear of the position, in the vehicle lengthwise direction, of the center pillar 20. The roof side outer lower member 47 has a bottom plate part 48, a side plate part 49, a downward projecting part 50 and flange parts 51 and 52. The bottom plate part 48 extends in the vehicle lengthwise direction, and its entire length is substantially along the horizontal. The bottom wall 31 of the step part 30 is formed by this bottom plate part 48. The side plate part 49 rises upward from the inner edge part, in the vehicle widthwise direction, of the bottom plate part 48. The side wall 32 of the step part 30 is formed by this bottom plate part 48. The downward projecting part 50 projects slightly downward from the front end part, in the vehicle lengthwise direction, of the side plate part 49 and from the end part, on the vehicle widthwise outside, of the side plate part 49. The flange part 51 is continuously formed on the continuing edge part, on the vehicle widthwise outside, of the bottom plate part 48 and the downward projecting part 50. The flange 52 is formed on the top edge part, on the vehicle widthwise inside, of the side plate part 49.

The roof side outer lower member 47 is welded to the flange part 43 of the roof side inner member 36 on the flange part 51, and welded to the flange part 44 of the roof side inner member 36 on the flange part 52. The roof side rail 26 is formed by the roof side inner member 36 and the roof side outer lower member 47 being jointed together. The cross section of the roof side rail 26 orthogonal to the vehicle lengthwise direction has a closed shape.

The roof side rail 26 has a bulk head 55. The bulk head 55 is joined to the front end part, in the vehicle lengthwise direction, of the roof side outer lower member 47. The bulk head 55 has a bottom plate part 56, a standing plate part 57, a downward projecting part 58, a flange part 59, 60. The bottom plate part 56, together with the bottom plate part 48 of the roof side outer lower member 47, forms the bottom wall 31 of the step part 30. The standing plate part 57 rises upward in a substantially vertical direction from the front edge part of the bottom plate part 56, and forms the standing wall 33 of the step part 30. The downward projecting part 58 projects slightly downward from the vehicle widthwise outside of the bottom plate part 56. The flange part 59 is continuously formed on the rear edge part, in the vehicle lengthwise direction, of the standing plate part 57, the bottom plate part 56 and the downward projecting part 58. The flange part 60 is formed continuously from the top edge part of the standing plate part 57 to the front edge part of the downward projecting part 58.

The flange part 59 of this bulk head 55 is welded to the front edge part, in the vehicle lengthwise direction, of the roof side outer lower member 47. Moreover, the end part on the vehicle widthwise inside of the flange part 60 is welded to the front edge part of the flange part 52 of the roof side outer lower member 47 and to the end part, on the vehicle widthwise inside, of the flange part 44 of the roof side inner member 36.

A roof side outer upper member 63 is welded to the top side of the bulk head 55 and the roof side outer lower member 47 so that it covers the step part 30 from above. The front edge part, in the vehicle lengthwise direction, of the roof side outer upper member 63 is welded to the top part of the flange part 60 of the bulk head 55.

An outer panel 65 is disposed outside, on the vehicle widthwise outside, of each part described above. The outer panel 65 has a vertical extending part 66 and a lengthwise extending part 67. The vertical extending part 66 extends in a vertical direction and constitutes the center pillar 20. The lengthwise extending part 67 extends, in the vehicle lengthwise direction, from the top end part of the vertical extending part 66. A cutout part 68 that is slightly concaved towards the front of the vehicle is formed on the top end side of the rear edge part, in the vehicle lengthwise direction, of the vertical extending part 66. The front edge part, in the vehicle lengthwise direction, of the cutout part 68 of the outer panel 65 is welded to the flange part 60 of the bulk head 55. Moreover, the lower side of the front edge part, in the vehicle lengthwise direction, of the cutout part 68 is welded to the downward projecting part 50 of the roof side outer lower member 47. The front edge part, in the vehicle lengthwise direction, of the cutout part 68 is aligned with the position of a curved concave part 69 in the vehicle lengthwise direction. The curved concaved part 69 constitutes the center pillar 20 of the vertical extending part 66, and is concaved towards the outside in the vehicle lateral direction. By having the front edge part, in the vehicle lengthwise direction, of the cutout part 68 welded to the flange part 60 of the bulk head 55, the top part of the center pillar 20 is joined to the bulk head 55.

Furthermore, as shown in FIG. 5, the roof arch 27 extending in the vehicle lateral direction is disposed on the top side of the roof side outer upper member 63, and is fixed on the end part, in the vehicle lateral direction, of the flange part 44 of the roof side inner member 36, with a bolt 72. The roof arch 27 has a hat type cross section, and is joined to a roof panel 77 to construct a closed cross sectional structure. A mounting hole 73 is formed in the roof arch 27. A weld nut 74 is aligned on the mounting hole 73, and is fixed on the top face side of the roof arch 27. The bolt 72 passes through the mounting hole 45 formed in the flange part 44 of the roof side inner member 36 and the mounting hole 73 formed in the roof arch 27 from the bottom side, and is screwed into the weld nut 74. By having the bolt 72 screwed into the weld nut 74, the roof arch 27 is fixed on the roof side inner member 36. In other words, the flange part 60 of the bulk head 55 that forms the standing wall 33 is joined to the roof side inner member 36, and the roof arch 27 is bolted to the flange part 44 of this roof side inner member 36. As shown in FIG. 3, the mounting hole 45 of the roof side inner member 36 is provided in close vicinity to the standing plate part 57 of the bulk head 55. Moreover, as described above, the center pillar 20 is also joined to the standing plate part 57 of the bulk head 55. Therefore, the center pillar 20 and the roof arch 27 are joined in the vicinity of the standing wall 33 that constitutes the front end part of the step part 30 of the roof side rail 26.

According to the vehicle upper body structure of the present embodiment described above, in the case where the step part 30 for arranging the slide rail 35 is formed on the roof side rail 26, the center pillar 20 and the roof arch 27 are joined in the vicinity of the standing wall 33 that constitutes the front end part of the step part 30, that is, in the vicinity of the part of the roof side rail 26 reinforced by the standing wall 33. Therefore, the center pillar 20 and the roof arch 27 are strongly joined to the roof side rail 26.

Moreover, the bulk head 55 that forms the standing wall 33 of the step part 30 is preferably integrated and formed together with the roof side outer lower member 47 that constitutes the bottom wall 31 and the side wall 32 of the step part 30 of the roof side rail 26. By having them integrated in this way, a reduction in the number of parts and in welding cost can be achieved.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle body structure comprising:
   a center pillar;
   a rear quarter pillar;
   an aperture part defined by the opening and closing of a rear door, wherein the center pillar is disposed on a front side of the aperture and the rear quarter pillar is disposed on a rear side of the aperture;
   a roof side rail formed in a top part of a vehicle body side part, the roof side rail further comprising a step part extending in a lengthwise direction of the vehicle body structure from the center pillar to the rear quarter pillar, the step part further including a bottom wall, a side wall and a standing wall, wherein the standing wall is joined to the bottom wall and the side wall and defines a front end part of the roof side rail, said standing wall extending transverse to the lengthwise direction of the vehicle and serving to reinforce a forward end of the roof side rail; and,
   a roof arch extending in a widthwise direction of the vehicle body structure, wherein the center pillar and the roof arch are joined to the roof side rail in the vicinity of the standing wall such that said roof side rail interconnects said center pillar and said roof arch while said standing wall reinforces said roof arch and said center pillar, and
   wherein the roof arch is operatively attached to a top surface of the roof side rail.

2. The vehicle body structure of claim 1 further comprising a roof side inner member extending in a lengthwise direction of the vehicle structure from the center pillar to the rear quarter pillar.

3. The vehicle body structure of claim 2, wherein the roof side inner member is disposed below and operatively attached to the step part.

* * * * *